UNITED STATES PATENT OFFICE 2,123,928

STABILIZED PARASITICIDAL COMPOSITION

Euclid W. Bousquet, Wilmington, Del., assignor, by mesne assignments, to E. I. du Pont de Nemours & Company, Wilmington, Del., a corporation of Delaware No Drawing. Application January 6, 1936, Serial No. 57,780

11 Claims. (Cl. 167—30)

The present invention relates to thio-diarylamine parasiticidal compositions stabilized by the addition thereto of certain sulfur compounds derived from sulfur acids of an oxidation stage lower than sulfuric acid.

Thio-diarylamine parasiticides readily deteriorate when exposed to atmospheric conditions and gradually lose their toxicity and efficiency. It was, for instance, found that a thio-diphenylamine insecticide lost 60% of its activity in killing insects when exposed in the open air five days.

I have found that parasiticidal compositions, based on thio-diarylamines which contain minor amounts, for instance, from 1 to 10% figured on the thio-diarylamine present, of a stable, reducing derivative of a lower sulfur acid, do not lose their parasiticidal efficiency in the same degree when exposed to atmospheric conditions.

In general I prefer to use neutral or only slightly basic, i. e., non-acidic compounds or derivatives of lower sulfur acid compounds which I admix with the thio-diarylamine to stabilize the latter's toxicity.

The lower sulfur acids, the derivatives of which are useful in my invention, are mainly sulfurous acid, $H_2SO_3$, thio-sulfurous acid $H_2S_2O_7$, hydrosulfurous acid $H_2S_2O_4$, the polythionic acids, hydrogen sulfid, etc. The free acids themselves are mostly unstable or volatile and it is only their stable derivatives which display a distinct reducing action in aqueous media which are contemplated for use as stabilizing agents for thio-diarylamine parasiticides.

Another common characteristic of these sulfur compounds is their reducing action in aqueous media. This reducing action is, for example, shown by their action on quinonic dyestuffs which are transformed into leuco-compounds by the action of such sulfur compounds, methylene blue being a dyestuff which is easily reduced to a leuco-compound by the sulfur compounds of my invention. Broadly speaking, these sulfur compounds are also capable of acting upon discolored thio-diphenylamine which, for instance, has been transformed by oxidation into a green compound to restore its original color.

The derivatives of hydrogen sulfid which are sufficiently stable, have reducing properties, and are available for the stabilization of thio-diphenylamine parasiticides, include water soluble sulfides, such as the alkali metal, barium, etc. sulfides, but I found that organic compounds containing the sulfhydryl, —S—H group, or organic sulfur compounds which can exist in a tautomeric form showing the —S—H group, are particularly efficient in my invention.

Among the organic sulfur compounds I obtain very useful stabilization with, for instance, mercaptans, such as mercaptobenzothiazole, octyl mercaptan, lauryl mercaptan, thio-beta-naphthol, thiourea, thioamides, diphenyl-thiourea, etc.

Among the stable, reducing derivatives of the lower sulfur-oxygen acids, I found that their ammonia, alkali-metal, amine, or other metal salts are readily available and useful in my invention.

They are stable under the conditions of exposure to the atmosphere at which they are used according to my invention. Besides these salts, their aldehyde and ketone derivatives are likewise very efficient for stabilizing thio-diarylamine parasiticides. Among the numerous compounds of this type which I contemplate admixing with thio-diarylamine compositions I wish to list the following: sodium or potassium sulfites; ammonium, sodium, potassium thiosulfates; ammonium, sodium, potassium, zinc hydrosulfites (in this connection I use the expression hydro sulfites in preference to "hypo" sulfites, in view of the fact that this latter expression is still used, particularly in commercial practice, to designate thiosulfates $M_2S_2O_7$, and this double use might lead to confusion); the aldehyde derivatives of the hydrosulfites, for instance, sodium or zinc formaldehyde-sulfoxylates; and the alkali metal polythionates.

The above includes substances of this type which are commonly available commercially, but it will be understood that my invention is not limited to the use of the commercially available substances.

It was found that thio-diarylamine parasiticides become greenish or bluish on exposure to the atmosphere, and that with this change of color towards the short wave length end of the spectrum, the toxicity correspondingly diminishes. When this discoloration is prevented or when the thio-diphenylamine is treated with a reducing sulfur compound as described herein, the toxicity of the thio-diarylamine is either maintained or restored.

In the exercise of my invention I intimately admix a minor amount, for instance, from 1 to 10% of a reducing sulfur compound with the thio-diarylamine and when sprayed on vegetation it will be found that the composition remains efficient without discoloration for a much longer period than a parasiticide containing no such inactivation inhibitor. For most purposes, I prefer to use a water insoluble sulfur compound, though under dry conditions, and for instance when using a liquid spray I can also use water soluble compounds which, on evaporation of the water of the spray, will deposit upon the particles of the insoluble thio-diarylamine.

A very simple and efficient manner of testing a given sulfur compound for its availability as an atmospheric inactivation inhibitor for thio-diarylamine parasiticides is as follows:

A few drops of an aqueous ferric chloride solution is added to a solution of thio-diphenylamine in acetone: the solution turns immediately green. When the acetone solution contains a small amount of a reducing sulfur compound as described herein, no such green coloration develops. Sulfur compounds which prevent this green discoloration were found to also efficiently inhibit the atmospheric inactivation of thio-diarylamine parasiticides.

In this test I found, for instance, that the discoloration by ferric chloride of a thio-diphenylamine solution is inhibited if the solution contains for instance 1% (based on the thio-diphenylamine) of mecaptobenzothiazole, octyl mercaptan, lauryl mercaptan, thio-urea, thio-beta-naphthol, diphenyl-thiourea, other substituted thioureas, a thioamide, a formaldehyde sulfoxylate, sodium sulfite, sodium thiosulfate, sodium hydrosulfite, etc.

These compounds have also been found to inhibit the atmospheric inactivation of thio-diphenylamine and other thi-diarylamine parasiticides.

The thio-diarylamine insecticides which are amenable to the effect of my novel inactivation inhibitors are water insoluble compounds of the general formula

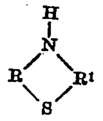

in which R and $R^1$ are aromatic nuclei.

The proto type of these compounds is thio-diphenylamine, which is produced, for instance, by heating diphenylamine with sulfur in the presence of a catalyst, such as aluminum chloride, ferric chloride, iodine, etc.

Other members of the novel group of insecticides according to my invention are the thio compounds obtained by the action of sulfur upon diarylamines such as, for instance, those obtained from phenyl-alpha-naphthyl amine which presumably has the formula

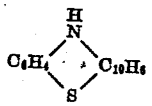

or from phenyl-beta-naphthylamine,
di-alpha-naphthylamine,
di-beta-naphthylamine,
di-biphenylamine,
N, N-diphenyl-p-phenylenediamine,
N, N-di-alpha-naphthyl-para phenylene-diamine,
N, N-di-biphenyl-metaphenylene-diamine,
N, N-di-pheny-metaphenylene-diamine,
N, N-di-phenyl-benzidine,
p, p'-di-(phenyl-amino) di-phenylamine.

The thio derivatives obtained from these diarylamines are all characterized by containing the heterocyclic nucleus

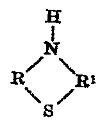

in which R and $R^1$ are aromatic nuclei in each of which two adjacent carbon atoms take part in forming the heterocyclic carbon-nitrogen-sulfur ring.

Some of the hydrogen atoms normally attached to R and $R^1$ may be substituted, or replaced by alkyl, cyclo-alkyl, aryl, hetero-cyclic nuclei, or halogen, nitro, amine, alkoxy or aryloxy groups, which do not impart water solubility to the compounds.

These parasiticidal compositions are used in aqueous suspension as sprays which include commonly spreading, emulsifying, or wetting out agents, or as dry dusts in admixture with inert substances, such as talc, foraminiferous powders and others.

In the performance of my invention I mix into such compositions a minor amount of the stabilizer. Most of my novel stabilizers do not seem to have any specific action upon the plant parasites, the control of which is intended by the application of my novel parasiticidal compositions, but whatever action they might have, for intance, a fungicidal action of the thionates, does not interfere with the specific thio-diarylamine effect.

I have, in every instance, found that the parasiticidal efficiency of the thio-diarylamine is greatly prolonged by my novel stabilizers, and compositions which, in the absence of these stabilizers, had lost most of their efficiency after several days exposure to the atmosphere, were greatly improved when a few per cent of my novel stabilizers were incorporated into the sprays, dusts, etc. which were used to control insecticidal and other pests on vegetable growths.

As an illustration of the magnitude and type of stabilization of the parasiticidal effect of a thio-diarylamine composition obtained by the use of my novel inactivation inhibitors I cite the following:

Apples were sprayed with a parasiticidal composition of three pounds thio-diphenylamine in 100 gallons of water which contained 3/100 lb. of a wetting agent, and in another set 15/100 lb. mercaptobenzothiazole was added to the spray. In each instance the apples were infected with codling moth immediately after spraying and five days after spraying. The results are tabulated below:

| Composition | Per cent control | | Per cent loss of initial efficiency | Percent improvement over unstabilized material |
|---|---|---|---|---|
| | Apples immediately infected | Apples infected 5 days after spray | | |
| Thio-diphenylamine | 88 | 53 | 40 | ---------- |
| Thio-diphenylamine + 5% mercaptobenzothiazole | 91 | 72 | 20 | 36 |

I claim:

1. A parasiticidal composition comprising a thio-diarylamine as the active parasiticidal ingredient stabilized by a stable reducing derivative of a sulfur acid of an oxidation stage lower than that of sulfuric acid.

2. A parasiticidal composition comprising a thio-diarylamine as the active parasiticidal ingredient stabilized by a stable derivative of a sulfur acid of an oxidation stage lower than that of sulfuric acid, said derivative having the property of inhibiting the discoloration toward green when present in an acetone solution of thio-diphenylamine on addition thereto of ferric chloride.

3. A parasiticidal composition comprising a thio-diarylamine as the active parasiticidal ingredient stabilized by a non-acidic, stable, reducing derivative of a lower sulfur-oxygen acid.

4. A parasiticidal composition comprising a thio-diphenylamine as the active parasiticidal ingredient stabilized by a sulfhydryl compound which has reducing properties and is able to react with thio-diphenylamine which has become of a green color by the action of atmospheric exposure to restore its color.

5. A parasiticidal composition comprising a thio-diphenylamine as the active parasiticidal ingredient stabilized by a stable organic compound having reducing properties and containing a sulfur-containing group in which an —S—H group is at least reactively available.

6. A parasiticidal composition comprising a thio-diarylamine as the active parasiticidal ingredient stabilized by a stable reducing derivative of a sulfur acid of an oxidation stage lower than that of sulfuric acid containing a sulfhydryl group.

7. A parasiticidal composition comprising a thio-diarylamine as the active parasiticidal ingredient stabilized by a stable reducing derivative of a sulfur acid of an oxidation stage lower than that of sulfuric acid containing a sulfur-containing group in which an —S—H group is at least reactively available.

8. A parasiticidal composition comprising thio-diphenylamine stabilized by a hydrosulfite.

9. A parasiticidal composition comprising thio-diphenylamine stabilized by a mercaptobenzothiazole.

10. A parasiticidal composition comprising thio-diphenylamine stabilized by a thiourea.

11. A parasiticidal composition comprising thio-diphenylamine stabilized by sodium hydrosulfite.

EUCLID W. BOUSQUET.